US008255684B2

(12) United States Patent
Benshetler et al.

(10) Patent No.: US 8,255,684 B2
(45) Date of Patent: Aug. 28, 2012

(54) METHOD AND SYSTEM FOR ENCRYPTION OF MESSAGES IN LAND MOBILE RADIO SYSTEMS

(75) Inventors: Jeffery E. Benshetler, Irving, TX (US); Arindam Roy, Plano, TX (US)

(73) Assignee: E.F. Johnson Company, Irving, TX (US)

(*) Notice: Subject to any disclaimer, the term of this patent is extended or adjusted under 35 U.S.C. 154(b) by 880 days.

(21) Appl. No.: 11/940,936

(22) Filed: Nov. 15, 2007

(65) Prior Publication Data

US 2009/0024845 A1  Jan. 22, 2009

Related U.S. Application Data

(60) Provisional application No. 60/950,868, filed on Jul. 17, 2007, provisional application No. 60/963,131, filed on Aug. 2, 2007.

(51) Int. Cl.
*H04L 9/32* (2006.01)

(52) U.S. Cl. ........ 713/156; 713/153; 713/168; 713/185; 726/9

(58) Field of Classification Search .............. 713/156, 713/153, 168, 185; 726/9; 380/286
See application file for complete search history.

(56) References Cited

U.S. PATENT DOCUMENTS

| | | | | |
|---|---|---|---|---|
| 5,850,444 | A | * | 12/1998 | Rune ............................ 705/79 |
| 6,941,457 | B1 | * | 9/2005 | Gundavelli et al. .......... 713/163 |
| 7,056,217 | B1 | | 6/2006 | Pelkey et al. |

(Continued)

OTHER PUBLICATIONS

Telecommunications Industry Association (TIA) with Electronic Industries Alliance (EIA), TIA/EIA Standard: Project 25—Trunking Control Channel Messages New Technology Standards Project Digital Radio Technical Standards (ANSI/TIA/EIA-102.AABC), May 2000, Telecommunications Industry Association (TIA), Arlington, VA (150 pages).

(Continued)

*Primary Examiner* — Jeffrey Pwu
*Assistant Examiner* — Samuel Ambaye
(74) *Attorney, Agent, or Firm* — Robert J. Ward; Gardere Wynne Sewell LLP

(57) ABSTRACT

A method and system for authentication of a plurality of sites in a land mobile radio (LMR) system and for encryption of messages exchanged by the sites. The plurality of sites are connected by a data network (e.g., IP network). The method includes transmitting by a first site its certificate. The certificate is created by a trusted authority by applying a selected function to the public key, the ID and other relevant information of the first site with the trusted authority's private key to generate a reduced representation and then encrypting the reduced representation with the trusted authority's private key. The method further includes receiving, by the other sites in the LMR system, the certificate transmitted by the first site. The method further includes decrypting, by the other sites, the certificate transmitted by the first site and authenticating the first site, wherein the certificate is decrypted using the trusted authority's public key. The method further includes generating a session key, encrypting the session key with the public key of the first site, and transmitting the encrypted session key to the first site. The method further includes decrypting, by the first site, the encrypted session key with the first site's private key, and transmitting, by the first site, a message encrypted with the shared session key. The method further includes multicasting the encrypted message over the data network. The method further includes receiving, by the other sites in the LMR system, the encrypted message transmitted by the first site, and decrypting the message with the session key.

26 Claims, 4 Drawing Sheets

U.S. PATENT DOCUMENTS

| | | | |
|---|---|---|---|
| 7,221,660 | B1 | 5/2007 | Simonson et al. |
| 7,636,339 | B2 | 12/2009 | Shaffer et al. |
| 7,764,633 | B2 | 7/2010 | Marque-Pucheu |
| 7,929,475 | B2 | 4/2011 | Simonson et al. |
| 2005/0180448 | A1 | 8/2005 | Kobayashi |
| 2006/0262800 | A1 | 11/2006 | Martinez et al. |
| 2007/0104121 | A1 | 5/2007 | Shaffer et al. |
| 2007/0242670 | A1* | 10/2007 | Simonson et al. ............ 370/390 |
| 2007/0259692 | A1* | 11/2007 | Venkatachalam ............. 455/560 |
| 2008/0123650 | A1 | 5/2008 | Bhaskar |
| 2008/0144644 | A1 | 6/2008 | Allan et al. |
| 2009/0024845 | A1 | 1/2009 | Benshetler et al. |

OTHER PUBLICATIONS

Telecommunications Industry Association (TIA) with Electronic Industries Alliance (EIA), TIA/EIA Standard: Project 25—Trunking Control Channel Messages, Addendum 1, SNDCP Trunking Control Channel Messages (ANSI/TIA/EIA-102.AABC-1), Sep. 2001, Telecommunications Industry Association (TIA), Arlington, VA (11 pages).

Telecommunications Industry Association (TIA) with Electronic Industries Alliance (EIA), TIA Standard: Project 25—Trunking Control Channel Messages, Addendum 2—Multiband Operations, New Technology Standards Project Digital Radio Technical Standards (ANSI/TIA-102.AABC-2), Dec. 2002, Telecommunications Industry Association (TIA), Arlington, VA (39 pages).

Telecommunications Industry Association (TIA) with Electronic Industries Alliance (EIA), TIA/EIA Telecommunications Systems Bulletin, APCO Project 25—Trunking Overview (TSB102.AABA), Apr. 1995, Telecommunications Industry Association (TIA), Arlington, VA (12 pages).

Office Action dated Oct. 15, 2010 issued in U.S. Appl. No. 11/937,963 (15 pages).

1st Notice of Allowance dated Mar. 4, 2011 issued in U.S. Appl. No. 11/937,963 (5 pages).

2nd Notice of Allowance dated Jul. 1, 2011 issued in U.S. Appl. No. 11/937,963 (7 pages).

* cited by examiner

METHOD AND SYSTEM FOR ENCRYPTION OF MESSAGES IN LAND MOBILE RADIO SYSTEMS

Pursuant to 35 U.S.C. §119(e), this application claims priority from, and hereby incorporates by reference for all purposes, U.S. Provisional Patent Application Ser. No. 60/950,868, entitled "Method and System for Encryption of Messages in Land Mobile Radio Systems," filed Jul. 17, 2007, and U.S. Provisional Patent Application Ser. No. 60/963,131, entitled "APCO 07 Brochure for End-to-End Encryption and Peer-to-Peer Communication," filed Aug. 2, 2007, both naming Arindam Roy and Jeffery Benshetler as inventors.

FIELD OF THE INVENTION

The invention relates generally to communication systems. More specifically, the invention relates to a method and system for encryption of messages in Land Mobile Radio Systems.

BACKGROUND OF THE INVENTION

Land Mobile Radio (LMR) systems ate deployed by organizations requiring instant communication between geographically dispersed and mobile personnel. Typical users of LMR systems include police departments, fire departments, medical personnel, EMS, and the military.

Current LMR systems can be configured to provide for radio communications between a site and subscriber units in the field. A subscriber unit may be a mobile unit or a portable unit. LMR systems can be as simple as two subscriber units communicating between themselves and a site over preset channels, or they can be complex consisting of tens of thousands of subscriber units and multiple sites.

LMR systems may be configured to cover a large geographical area by providing hundreds of sites. For security purpose, when a previously unknown site intends to communicate with other sites in an LMR system, the previously unknown site needs to be authenticated. Current methods for authentication of a previously unknown site generally require manual configuration of all sites in an LMR system. Also, in order to provide secure communication among the sites, messages among the sites need to be encrypted. At present, encrypted messages are generally unicast, requiring high bandwidth. Multicast messaging is the most bandwidth efficient form of one-to-many IP communications. However, the standard method of multicast encryption, IPSec, is a point-to-point tunneling protocol; multicast over IPSec is converted to unicast. While messages encrypted with a public key may be multicast, however it is generally more computationally expensive to use public key encryption for voice packet transmission.

BRIEF DESCRIPTION OF THE DRAWINGS

For a more complete understanding of the features and advantages of the present invention, reference is now made to the detailed description of the invention along with the accompanying FIGS. and in which.

DETAILED DESCRIPTION OF THE EMBODIMENTS OF THE INVENTION

Figure 1:
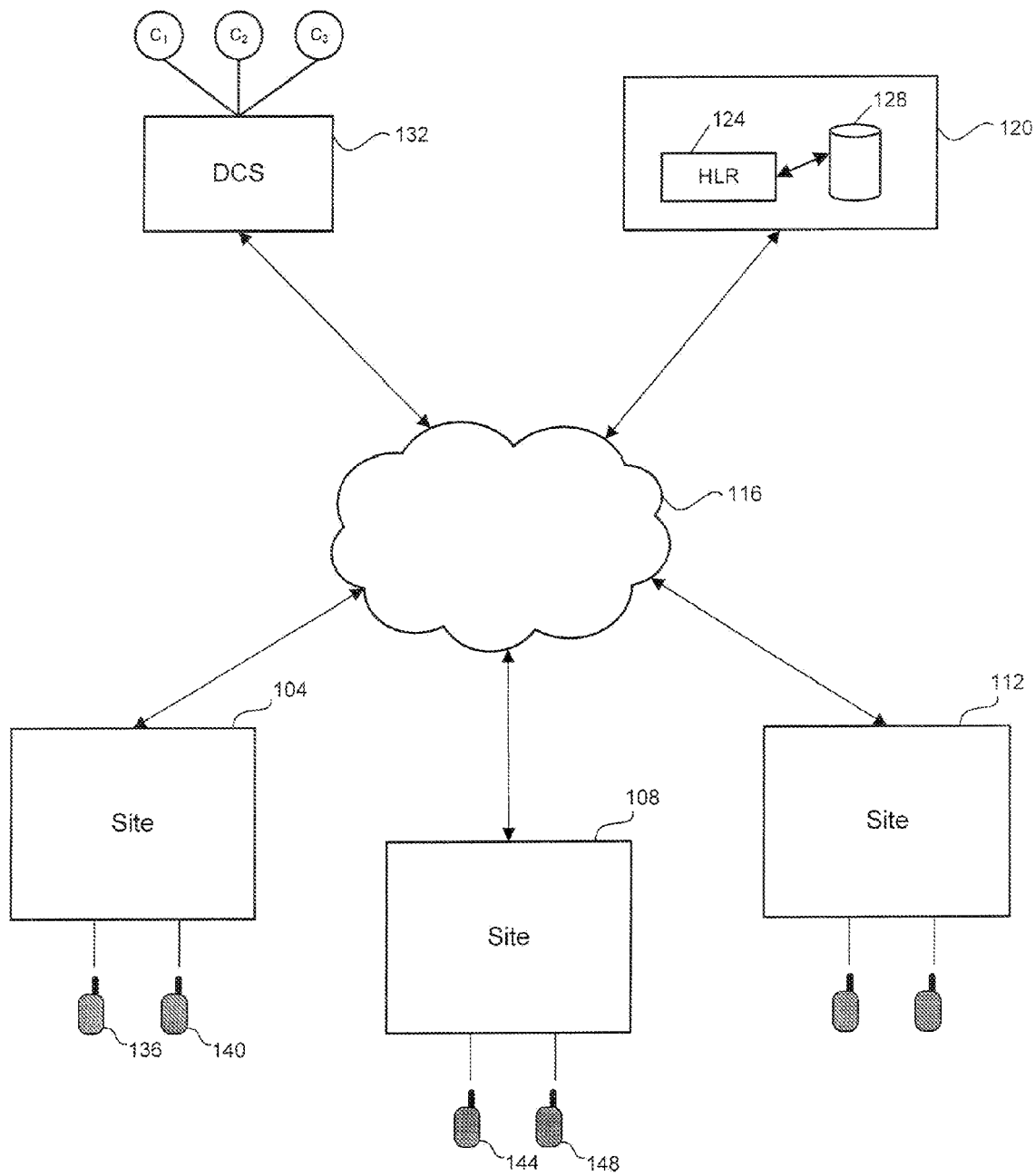
FIG. 1 illustrates a Land Mobile Radio system in accordance with an embodiment of the invention.

FIG. 1 illustrates an LMR system 100 including sites 104, 108 and 112 in accordance with an embodiment of the invention. The sites 104, 108 and 112 are interconnected by a data network 116. The data network can be an IP network. However, the data network may also be any other type of network (e.g., packet switched network, ATM network). The system 100 includes a network management system 120. The network management system 120 includes a home location register (HLR) 124 and a database 128. The system 200 may also include a digital console subsystem 132 having one or more consoles (C1-C3). The function and operation of the network management system 120 and the console subsystem 132 are understood by those skilled in the art. One or more subscriber units (e.g., mobile units) may operate under the control of a site.

In order to prevent unauthorized sites or other elements gain access to the LMR system, when a previously unknown site intends to communicate with other sites in the LMR system 100, the site must be authenticated. More specifically, before allowing a previously unknown site to communicate with other sites in the LMR system 100, the previously unknown site must be authenticated. Also, for secure communication among the sites, messages among the sites must be encrypted. While P25 standard supports encrypted voice packets, meta-data and control plane messages are not encrypted, thereby allowing unauthorized listeners to intercept the meta-data and control plane messages.

In one embodiment, secured communication is provided by encrypting messages (also referred to as "IP traffic") in the LMR system 100. Both bearer plane traffic and control plane traffic are encrypted.

In one embodiment, a method provides improved end-to-end security by combining a public key cryptographic method with a secret session key cryptographic method. More specifically, the public key cryptography is utilized to authenticate previously unknown sites in a dynamic discovery process. Authenticated sites are provided with a secret session key to encrypt and decrypt messages in order to communicate with other sites in the LMR system 100. In one embodiment, authenticated sites are provided with a rapidly varying symmetric session key that can be interpreted only by the authenticated sites.

In one embodiment, when a previously unknown site intends to communicate with other sites in an LMR system, the site broadcasts its certificate (e.g., digital certificate) over the IP network 116. The digital certificate may be created by a trusted authority or an independent third party engaged in verification and authentication of traffic over the Internet. The digital certificate must be signed by an entity trusted by all participants to be useful. For example, the digital certificate may be created by Verisign, a well known trusted authority. In another embodiment, the digital certificate may be created by the network management system of the LMR system or any designated certificate authority. As will be apparent to those skilled in the art, the network management system can be a dedicated server that performs various network management function including creating digital certificates. Thus, the network management system may perform the function of a trusted authority by creating the digital certificate.

In one embodiment, the trusted authority applies a selected function to the site's public key, its ID and other relevant information to generate a reduced representation of the information, which is also referred to as a message digest. The selected function may be a non-invertible function (e.g., a hash function) or any other well known function to generate a reduced representation of the information. A reduced representation of the information, i.e., message digest, provides improved security while significantly lowering bandwidth requirement.

As will be understood by those skilled in the art, the public key of a site is available to the public. As discussed above, the trusted authority creates a message digest from the public key, the ID and other relevant information of the site. The message digest is then encrypted by the trusted authority's private key, generating a digital signature of the particular site. The digital signature thus includes the public key, the ID and other relevant information of the particular site.

A digital certificate of a site includes its digital signature and its public key. In one embodiment, each site is provided with its own digital certificate or each site may create its own digital certificate that must be signed by a community trusted authority. The other relevant information may include the date when the digital certificate becomes valid and the date the digital certificate expires.

In one embodiment, when a previously unknown site intends to participate in LMR communication (i.e., intends to communicate with other sites), the site first transmits its digital certificate. The digital certificate is received by the other sites in the LMR system. The other sites in the LMR system decrypt the digital certificate with the public key of the trusted authority in order to retrieve the enclosed message digest. The message digest is used to verify the site. In one embodiment, the enclosed message digest is a hash that is compared with a locally calculated hash for verification purpose. The authentication of a previously unknown site using a digital certificate is also referred to as the dynamic discovery process.

In another embodiment, a trusted authority may create a "certificate" for a site by encrypting only the public key of that site with the trusted authority's private key. Alternatively, a trusted authority may create a "certificate" for a site by encrypting the public key and the ID of that site. The site may then transmit its own "certificate" for authentication purposes if the site intends to communicate with other sites. The other sites in the LMR system may decrypt the "certificate" using the public key of the trusted authority.

In one embodiment, after the public key of the previously unknown site is authenticated, the site is provided with a session key that is encrypted with the public key of the particular site. In one embodiment, the session key is a secret symmetric session key. In one embodiment, the authenticated site is provided with a rapidly varying secret symmetric session key to encrypt and decrypt messages. As will be understood by those skilled in the art, a message encrypted by a symmetric session key can only be decrypted by the same session key. Also, it is less computationally expensive to use public key cryptography to establish shared keys for symmetric cryptography.

In one embodiment, the site may be provided with a session key that varies periodically or that varies each LMR session. In another embodiment, the site may be provided with a session key that varies each time the site intends to transmit a message. As will be apparent to those skilled in the art, the session key maybe varied in other manner in order to provide security in the LMR communication.

After the site is authenticated and is provided with the encrypted symmetric session key, the site decrypts the session key with its own private key and is ready to transmit and receive messages, i.e., participate in the LMR communication. Thus, the digital certificate is multicast to all listening sites. These sites validate the digital certificate and add the new site to the active site list. When a call is brought up, the initiating site multicasts an inquiry asking which sites want to participate in the call. The participating sites unicast back a desire to participate. The participating sites then each receive the session key encrypted with that sites public key via unicast. The participating sites can decrypt the session key using their own private key and participate in the communication.

The site may then transmit a message encrypted with the session key. In one embodiment, the encrypted message is multicast over the IP network. In one embodiment, the message is encrypted by a symmetric session key, thus allowing the encrypted message to be multicast over the LP network, thereby reducing bandwidth. The recipients of the multicast encrypted message can decrypt the message with the same session key. As will be appreciated, by utilizing a symmetric session key to encrypt the message, a site is able to multicast the message without requiring high bandwidth. In contrast, because existing implementations are point to point requiring conversion of multicast into unicast at the transport layer, the bandwidth requirement is significantly higher. Also, since the session key can only be decrypted by the intended recipient using its private key, a message encrypted by the session key and transmitted cannot be subsequently repudiated by the transmitting site. Accordingly, the encryption method also provides non-repudiation of transmitted messages.

Figure 2:
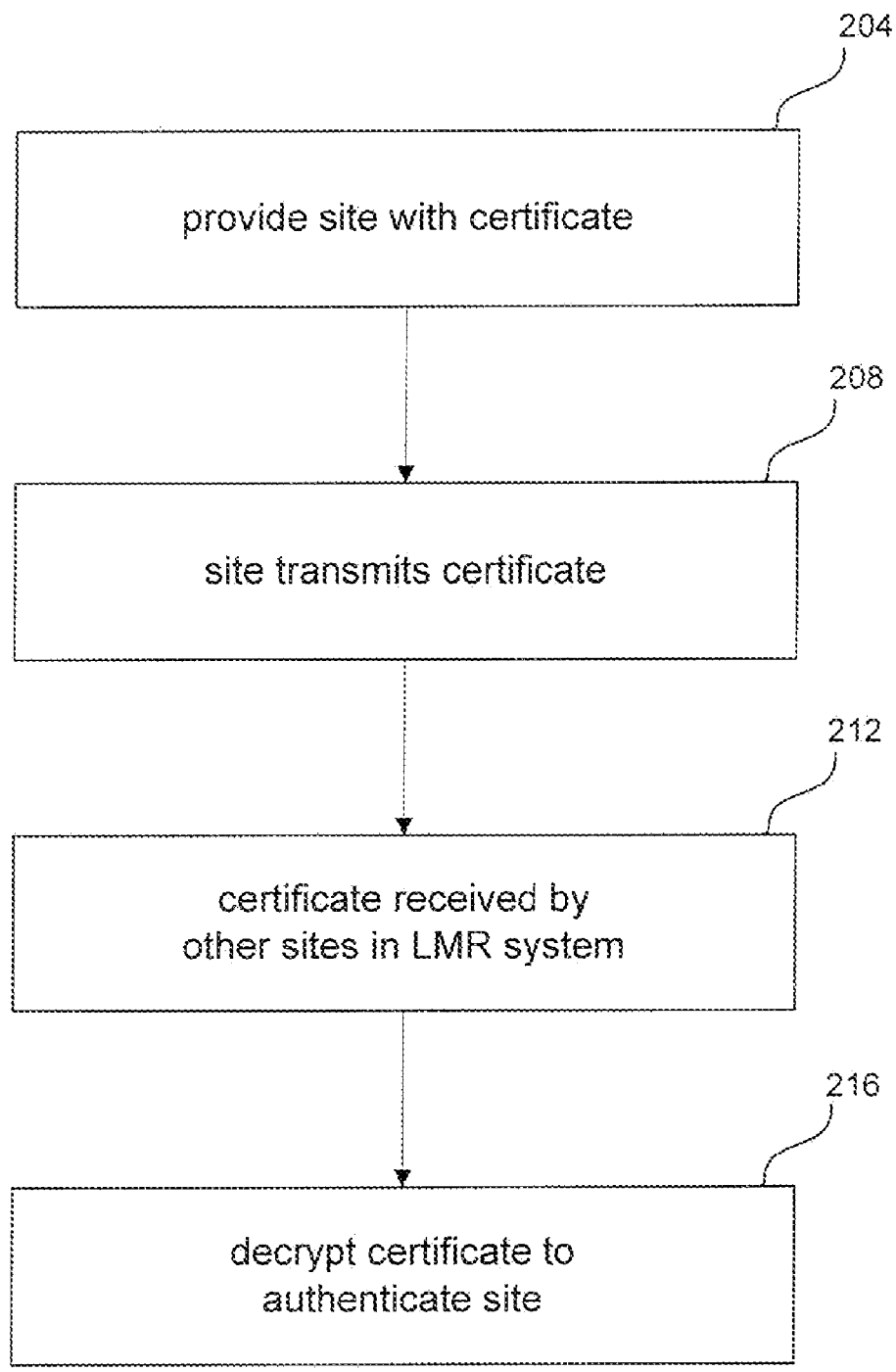
FIG. 2 is an exemplary flow diagram of the steps of authenticating a previously unknown site or end point in accordance with one embodiment.

FIG. 2 is an exemplary flow diagram of the steps of authenticating a previously unknown site in accordance with one embodiment. In step 204, the site or end point is provided with a digital certificate. As discussed before, in one embodiment the digital certificate is created by a trusted authority by applying a selected function (e.g., non-invertible function) to the public key, the ID and other relevant information (e.g., start and expiration dates of digital certificate) of the particular site to create a reduced representation or message digest and then encrypting the reduced representation with the trusted authority's private key. In one embodiment, the digital certificate is created by applying a hash function to the public key, the ID and other relevant information of the particular site to generate a hash or reduced representation and then encrypting the hash or reduced representation with the trusted authority's private key.

In step 208, the site transmits its digital certificate. In step 212, the digital certificate is received by other sites in the LMR system. In step 216, the digital certificate is decrypted by the recipients with the public key of the trusted authority. As discussed before, the digital certificate is decrypted to retrieve the enclosed reduced representation (e.g., hash). In one embodiment, the enclosed hash is compared with a locally calculated hash to authenticate the site.

Figure 3:
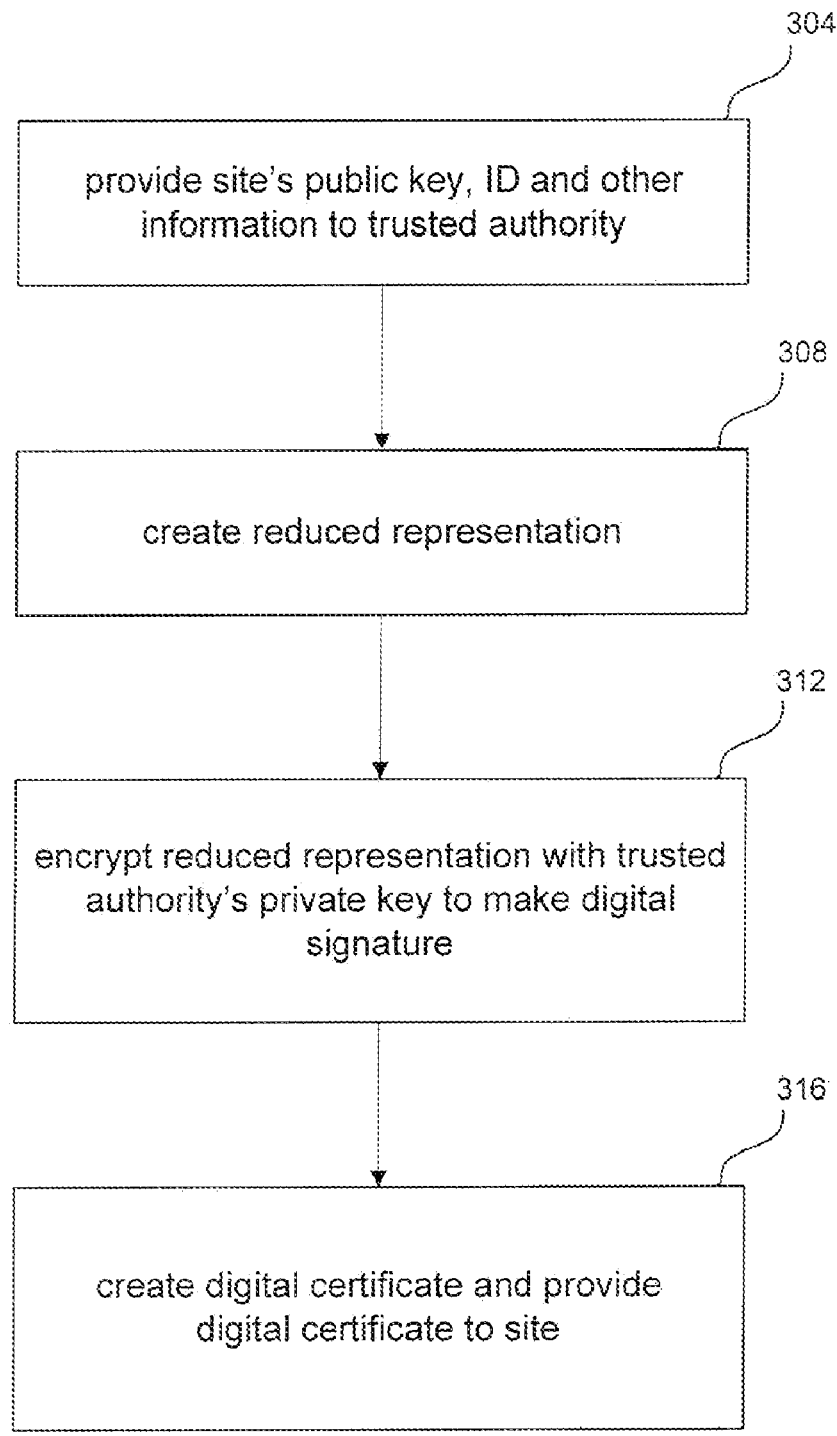
FIG. 3 is an exemplary flow diagram of the steps for generating a digital certificate for a site.

FIG. 3 is an exemplary flow diagram of the steps for generating a digital certificate for a site. In step 304, the public key, the ID and other relevant information (collectively referred to as "site information") of the site is provided to a trusted authority. In step 308, the trusted authority applies a selected function (e.g., non-invertible function) to the site information to create a reduced representation (e.g., hash) of the site information. In step 312, the reduced representation is encrypted with the private key of the trusted authority to create a digital signature. As discussed before, a digital certificate includes a digital signature of the site along with the public key of the site, In step 316, a digital certificate is created and is provided to the site.

Figure 4:
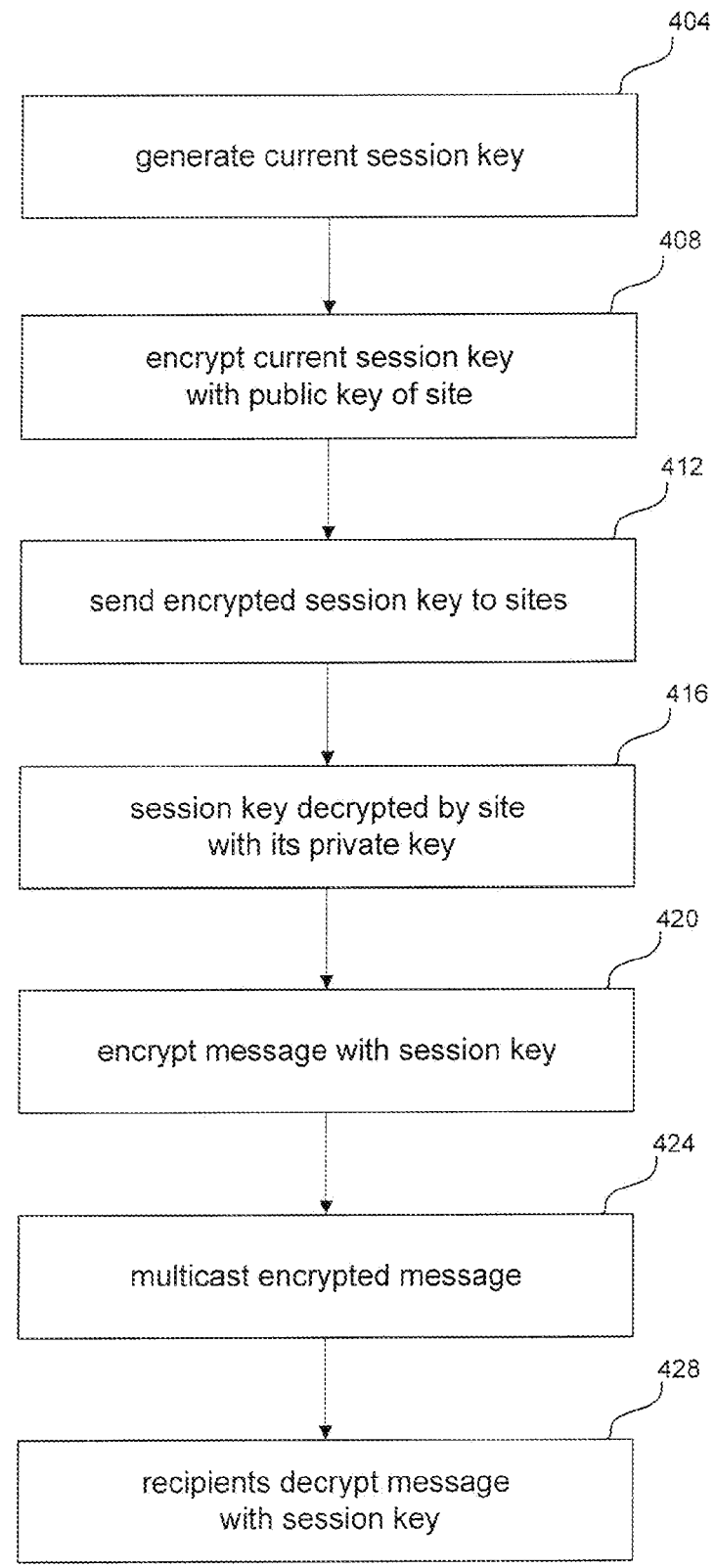
FIG. 4 is an exemplary flow diagram of the steps for transmission and reception of messages.

FIG. 4 is an exemplary flow diagram of the steps of transmission and reception of messages in the LMR system. In step 404, a current session key is generated. As discussed before, the current session key is a secret session key. In one embodiment, the current session key is a secret symmetric key that can be varied rapidly. In step 408, the current session key is encrypted with the public key of each authenticated site to create an encrypted session key for each site. In step 412, each authenticated site is provided with the encrypted session key. In step 416, the session key is decrypted by the authenticated sites using their respective private keys. As discussed before, in one embodiment the authenticated sites are provided with a symmetric session key. In step 420, a site encrypts a message with the session key. In step 424, the site transmits the encrypted message. Since the message is encrypted with a symmetric session key, the message can be multicast without requiring a large bandwidth. In step 428, the other participating sites receive and decrypt the encrypted message with the session key. As discussed before, in order to improved security, the session key can be varied rapidly.

By way of examples, but not limitations, various aspects of the invention, such as authentication, dynamic discovery, and encryption of messages have been described above in connection with sites. However, it will be apparent to those skilled the art that the various aspects of the invention can be used in connection with radio frequency sub-systems (RFSS), repeaters, transceivers and high level systems comprising a plurality of RFSS. For example, the authentication and dynamic discovery process can be used to authenticate and dynamically discover RFSS, repeaters, high level systems comprising a plurality of RFSS, or other elements of a communication system. Likewise, the encryption of messages described above can be used to encrypt messages among RFSS, repeaters, high level systems comprising a plurality of RFSS, or other elements of a communication system.

Also, by way of examples, but not limitations, various aspects of the invention, such as authentication, dynamic discovery, and encryption of messages have been described above in connection with a land mobile radio (LMR) system. However, it will be apparent to those skilled the art that the various aspects of the invention can be used in connection with other types of communication systems (i.e., non-LMR-type communication systems). For example, the authentication and dynamic discovery process can be used to authenticate and dynamically discover sites and other elements of a non-LMR-type communication system. Likewise, the encryption of messages described above can be used to encrypt messages among sites or among other elements of a non-LMR-type communication system.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method for authentication of a plurality of sites in a land mobile radio (LMR) system and for encryption of messages exchanged by the sites, the plurality of sites being connected by a data network, comprising: transmitting by a first site its certificate, wherein the certificate is created by a trusted authority by encrypting the public key, the ID and other relevant information of the first site with the trusted authority's private key; receiving, by the other sites in the LMR system, the certificate transmitted by the first site; decrypting, by the other sites, the certificate transmitted by the first site and authenticating the first site, wherein the certificate is decrypted using the trusted authority's public key; generating a session key that is a shared session key that is valid across a multicast group of which the sites in the LMR system are members; encrypting the session key with the public key of the first site and transmitting the encrypted session key to the first site; decrypting, by the first site, the encrypted session key with the first site's private key; and multicasting to the multicast group, by the first site, a message encrypted with the session key.

2. The method according to claim 1 further comprising multicasting the encrypted message on an IP network.

3. The method according to claim 1 further comprising multicasting the encrypted message on a packet switched network.

4. The method according to claim 1 further comprising:
receiving, by the other sites in the LMR system, the encrypted message multicast by the first site; and decrypting the message with the session key.

5. The method according to claim 1, wherein the certificate is a digital certificate of the first site.

6. The method according to claim 1 further comprising:
applying a selected function to the first site's public key, ID and other relevant information of the first site to create a reduced representation;
encrypting the reduced representation by the trusted authority's private key to create the certificate.

7. The method according to claim 6, wherein the selected function is a hash function.

8. The method according to claim 1 further comprising:
multicasting, by each site, its respective certificate when the site intends to multicast a message encrypted with the shared session key to the other sites; and receiving, by each of the sites, a newly generated shared session key after the site is authenticated, thereby varying the shared session key for each multicast of each message encrypted with the shared session key.

9. The method according to claim 1, wherein the session key is a symmetric session key.

10. The method according to claim 1, wherein the session key is a secret symmetric session key.

11. The method according to claim 1 further comprising transmitting a new session key after a predetermined time interval.

12. The method according to claim 1 further comprising transmitting a new session key each time a site intends to exchange session key encrypted messages.

13. The method according to claim 1, further comprising:
applying a hash function to the first site's public key, ID and other information of the first site to create a reduced representation; and encrypting the reduced representation with the private key of the trusted authority to generate a certificate of the first site.

14. The method according to claim 13 further comprising:
decrypting the certificate with the trusted authority's private key; and comparing the decrypted certificate with a locally calculated hash of the public key and authenticating the site.

15. A method for authentication of a plurality of sites in a land mobile radio (LMR) system and for encryption of messages exchanged by the sites, the plurality of sites being connected by a data network, comprising:
transmitting by a first site its certificate, wherein the certificate is created by a trusted authority by encrypting the public key of the first site with the trusted authority's private key; receiving, by the other sites in the LMR system the certificate transmitted by the first site; decrypting, by the other sites, the certificate transmitted by the first site and authenticating the first site, wherein the certificate is decrypted using the trusted authority's public key; generating a session key that is a shared session key valid across a multicast group of which the sites in the LMR system are members; encrypting the session key with the public key of the first site and transmitting the encrypted session key to the first site; decrypting, by the first site, the encrypted session key with the first site's private key; and multicasting to the multicast group, by the first site, a message encrypted with the session key.

16. The method according to claim 15 further comprising multicasting the encrypted message on an IP network.

17. The method according to claim 15 further comprising: receiving, by the other sites in the LMR system, the encrypted message multicast by the first site; and decrypting the message with the session key.

18. The method according to claim 15, further comprising: applying a hash function to the first site's public key to create a reduced representation; and encrypting the reduced representation with the private key of the trusted authority to create a certificate of the first site.

19. A method for authentication of a plurality of sites in a land mobile radio (LMR) system and for encryption of messages exchanged by the sites, the plurality of sites being connected by a data network, comprising: authenticating a first site by a previously authenticated site in the LMR system that is a member of a multicast group; generating a session key that is a shared session key that is valid across the multicast group; encrypting the session key with the public key of the first site and transmitting the encrypted session key to the first site; decrypting, by the first site, the encrypted session key with the first site's private key; and multicasting to the multicast group, by the first site, a message encrypted with the session key.

20. The method according to claim 1 further comprising: receiving, by the other sites in the LMR system, the encrypted message multicast by the first site; and decrypting the message with the session key.

21. The method according to claim 1 further comprising encrypting the public key of the first site with the private key of the previously authenticated site, thereby creating a certificate for the first site.

22. The method according to claim 21, further comprising multicasting, by the first site, its certificate when the first site intends to communicate with other sites in the LMR system.

23. A computer-implemented method for authentication of a plurality of sites in a land mobile radio (LMR) system and for encryption of messages exchanged by the sites, the plurality of sites being connected by an IP network, comprising: transmitting by a first site its certificate, wherein the certificate is created by a trusted authority by encrypting the public key, the ID and other relevant information of the first site with the trusted authority's private key; receiving, by the other sites in the LMR system, the certificate transmitted by the first site; decrypting, by the other sites, the certificate transmitted by the first site and authenticating the first site, wherein the certificate is decrypted using the trusted authority's public key; generating a session key that is a shared session key valid across a multicast group of which sites in the LMR system are members; encrypting the session key with the public key of the first site and transmitting the encrypted session key to the first site; decrypting, by the first site, the encrypted session key with the first site's private key; and multicasting to the multicast group, by the first site, a message encrypted with the session key.

24. A system for authentication of a plurality of sites in a land mobile radio (LMR) network and for encryption of messages exchanged by the sites, the plurality of sites being connected by an IP network, the system utilizing a plurality of method steps comprising: transmitting by a first site its certificate, wherein the certificate is created by a trusted authority by encrypting the public key, the ID and other relevant information of the first site with the trusted authority's private key; receiving, by the other sites in the LMR system, the certificate transmitted by the first site; decrypting, by the other sites, the certificate transmitted by the first site and authenticating the first site, wherein the certificate is decrypted using the trusted authority's public key; generating a session key that is a shared session key valid across a multicast group of which the LMR sites are members; encrypting the session key with the public key of the first site and transmitting the encrypted session key to the first site; decrypting, by the first site, the encrypted session key with the first site's private key; and multicasting to the multicast group, by the first site, a message encrypted with the session key.

25. The system according to claim 24, wherein the method steps further comprise: receiving, by the other sites in the LMR system, the encrypted message multicast by the first site; and decrypting the message with the session key.

26. A method for authentication of a plurality of sites in a land mobile radio (LMR) system and for encryption of messages exchanged by the sites, the plurality of sites being connected by a data network, comprising: transmitting by a first site its certificate, wherein the certificate is created by a trusted authority by encrypting the public key, the ID and other relevant information of the first site with the trusted authority's private key; receiving, by the other sites in the LMR system, the certificate transmitted by the first site; decrypting, by the other sites, the certificate transmitted by the first site and authenticating the first site, wherein the certificate is decrypted using the trusted authority's public key; generating a session key that is a shared session key that is valid across a multicast group of which the sites in the LMR system are members; encrypting the session key with the public key of the first site and transmitting the encrypted session key to the first site; decrypting, by the first site, the encrypted session key with the first site's private key; multicasting to the multicast group, by the first site, a message encrypted with the session key; performing peer to peer negotiation of multicasting source role among the sites each time a call is brought up, including: (a) multicasting, by an initiating site, an inquiry asking which sites want to participate in the call; (b) unicasting back to the initiating site, by the participating sites, their desire to participate in the call; (c) unicasting, by the initiating site, a new session key to the participating sites, wherein each respective unicast of the new session key is encrypted with the respective public key of the respective participating site; and (d) multicasting, by the initiating site, voice data of the call that is encrypted with the new session key.

* * * * *